(No Model.) 7 Sheets—Sheet 3.
W. R. CUNNINGHAM.
BRICK OR TILE CUTTING MACHINE.

No. 459,719. Patented Sept. 15, 1891.

Witnesses:
Inventor:

(No Model.) 7 Sheets—Sheet 4.
W. R. CUNNINGHAM.
BRICK OR TILE CUTTING MACHINE.
No. 459,719. Patented Sept. 15, 1891.

Witnesses: Inventor:

(No Model.) 7 Sheets—Sheet 5.

W. R. CUNNINGHAM.
BRICK OR TILE CUTTING MACHINE.

No. 459,719. Patented Sept. 15, 1891.

Witnesses:
Inventor:

(No Model.) 7 Sheets—Sheet 6.
W. R. CUNNINGHAM.
BRICK OR TILE CUTTING MACHINE.
No. 459,719. Patented Sept. 15, 1891.
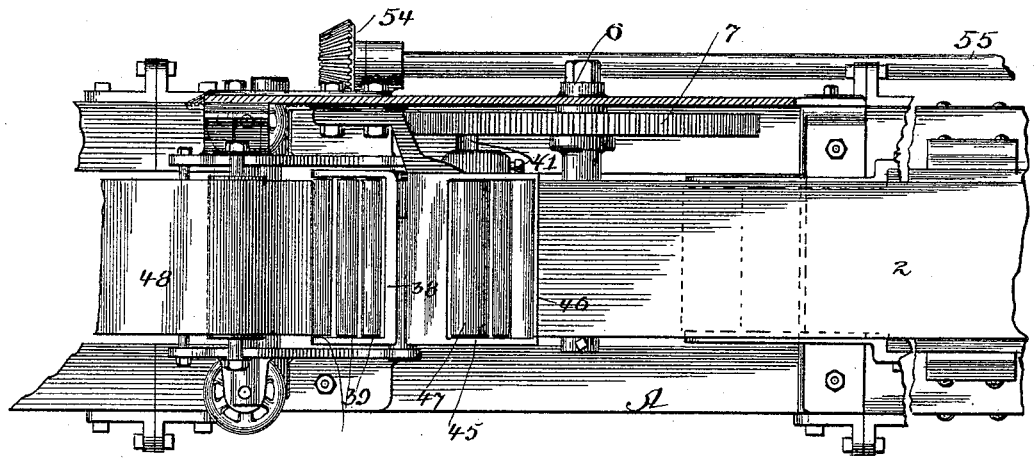
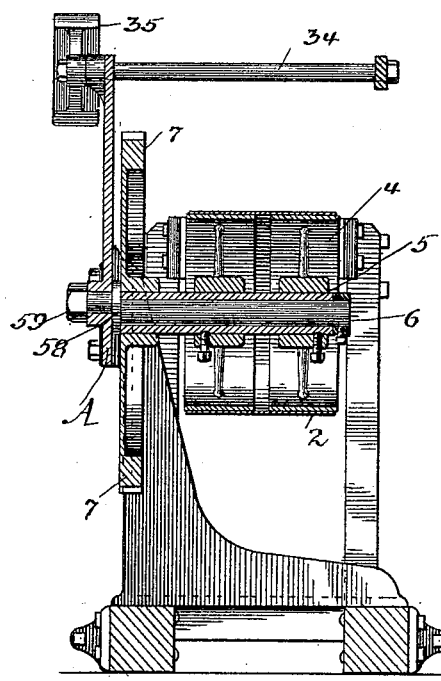

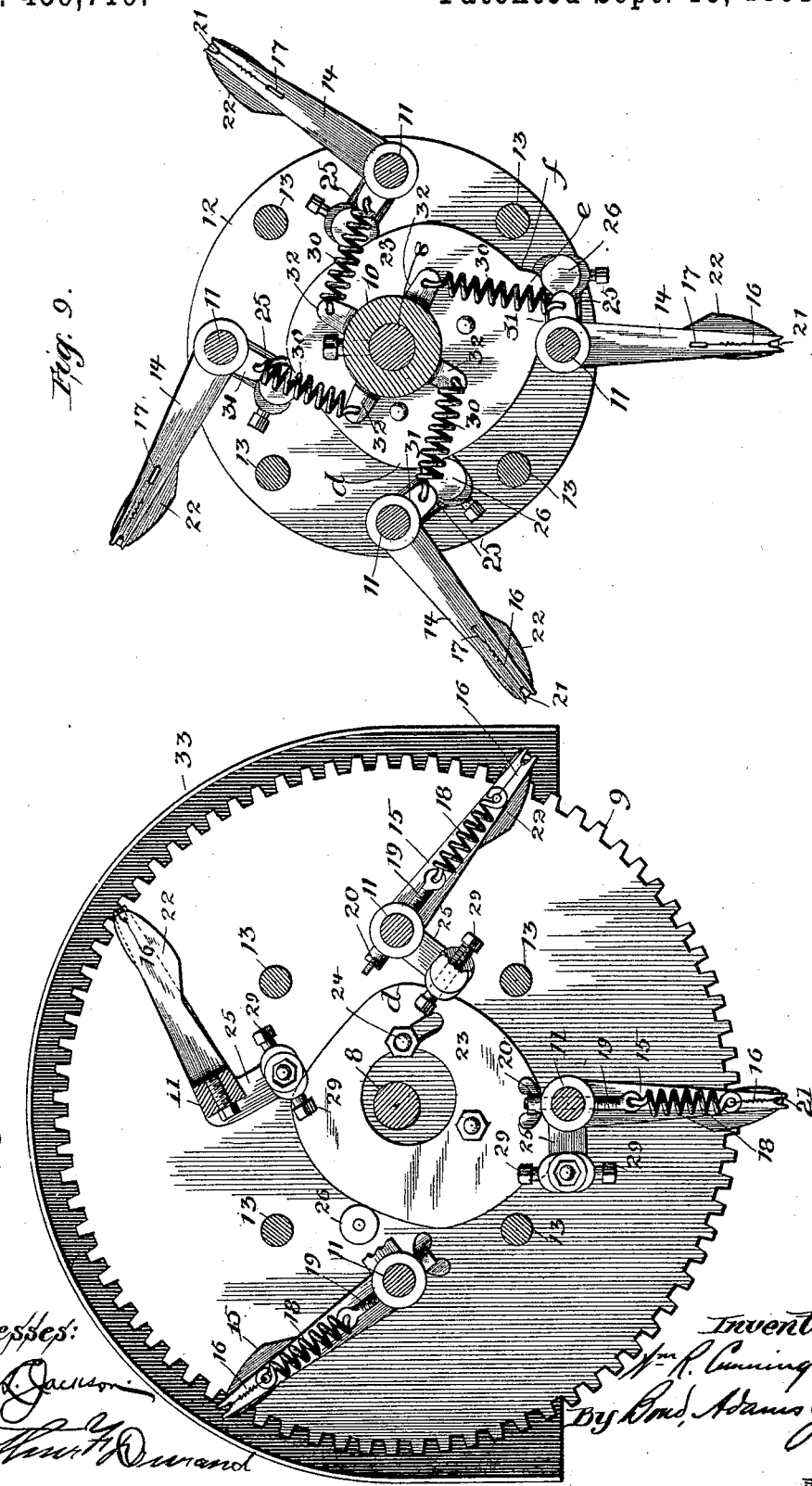

UNITED STATES PATENT OFFICE.

WILLIAM R. CUNNINGHAM, OF FRANKFORT, INDIANA, ASSIGNOR TO THE WALLACE MANUFACTURING COMPANY, OF SAME PLACE.

BRICK OR TILE CUTTING MACHINE.

SPECIFICATION forming part of Letters Patent No. 459,719, dated September 15, 1891.

Application filed October 4, 1890. Serial No. 367,120. (No model.)

*To all whom it may concern:*

Be it known that I, WILLIAM R. CUNNINGHAM, a citizen of the United States, residing at Frankfort, in the county of Clinton and State of Indiana, have invented certain new and useful Improvements in Machines for Cutting Brick or other Clay Products, of which the following is a specification, reference being had to the accompanying drawings, in which—

Figure 1:
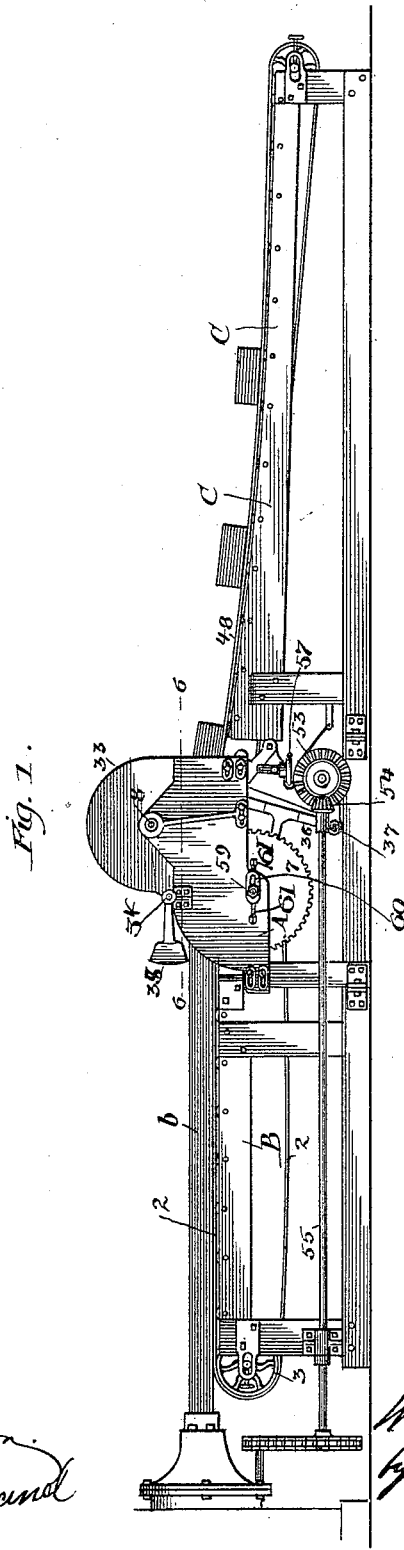
Figure 2:
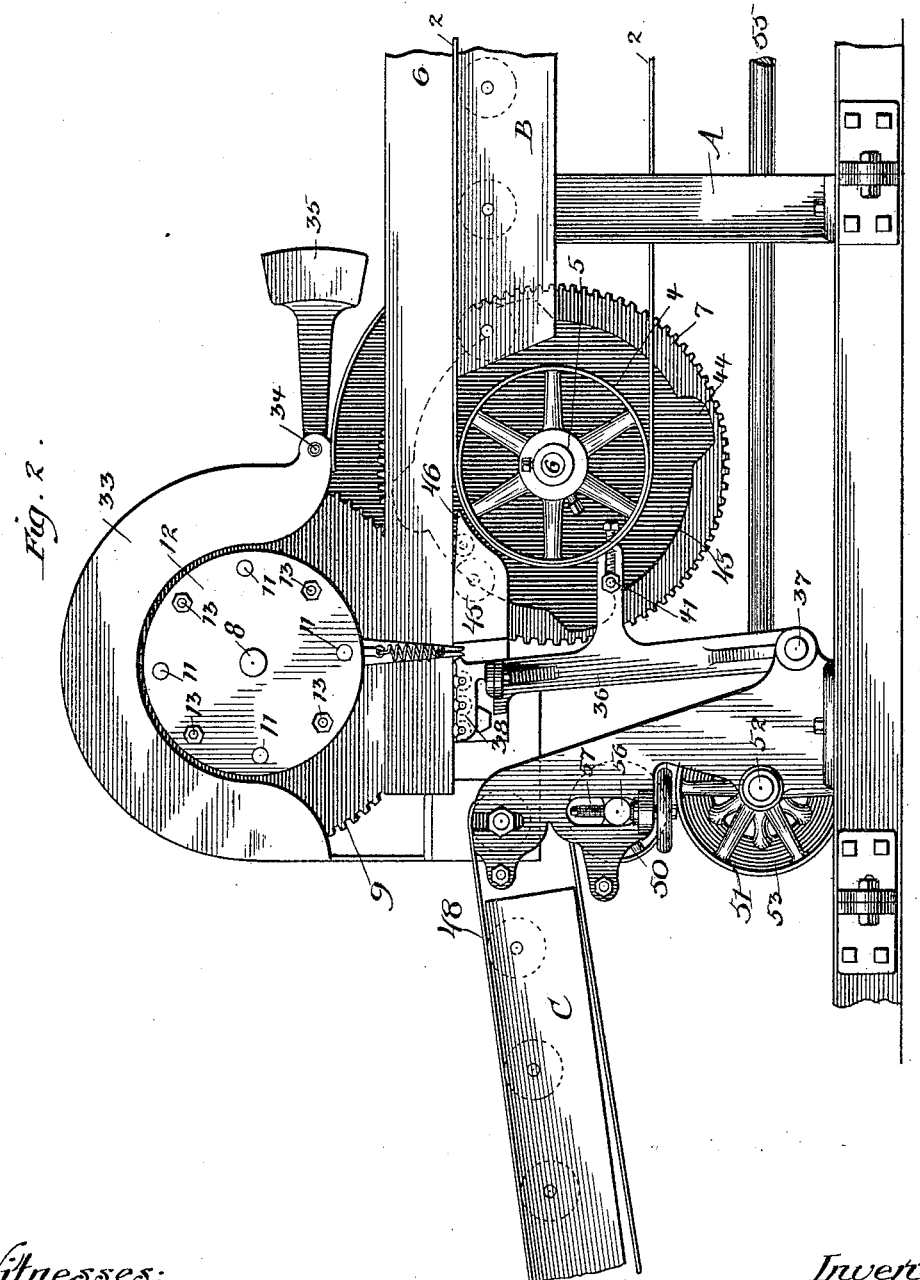
Figure 3:
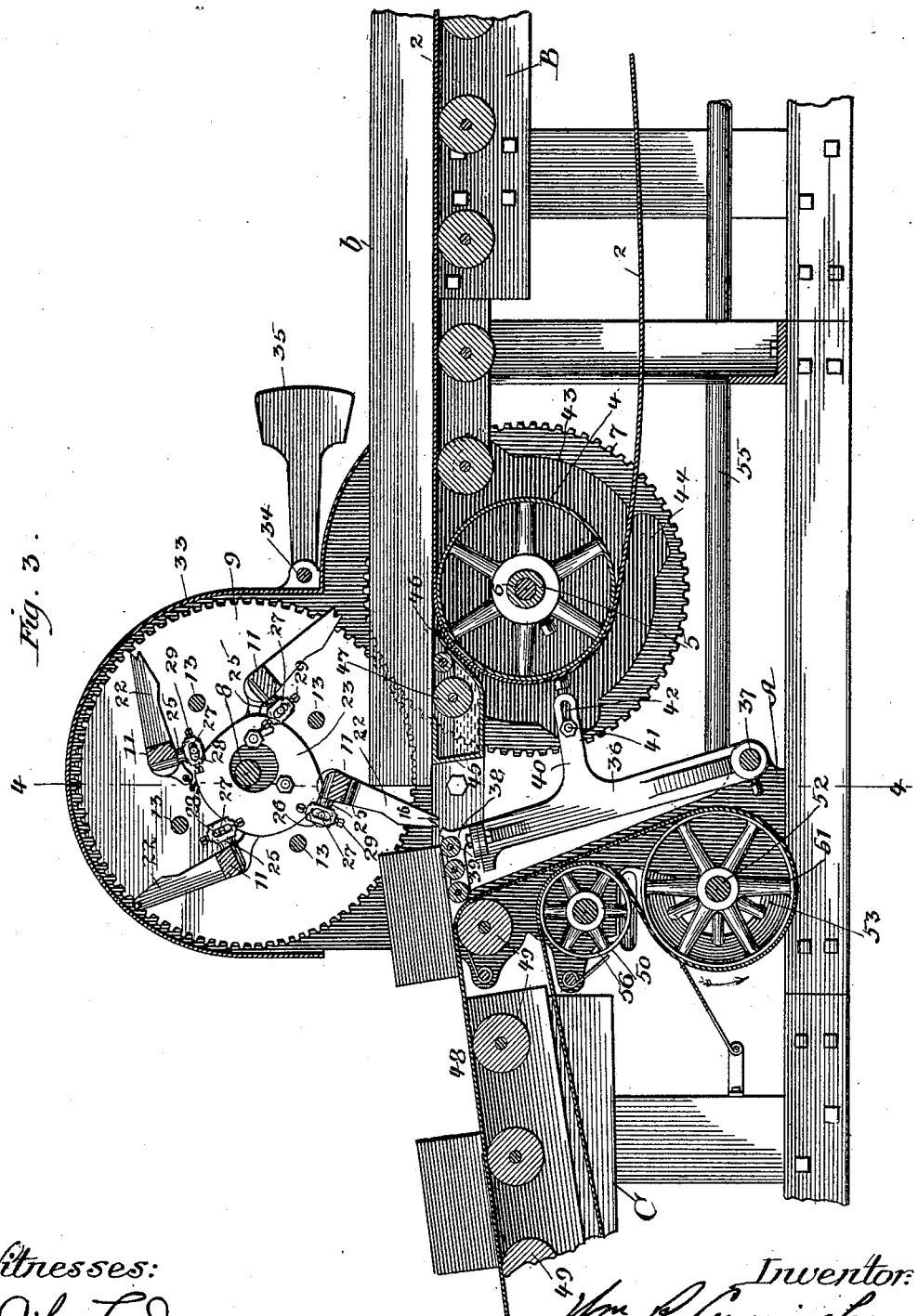
Figure 4:
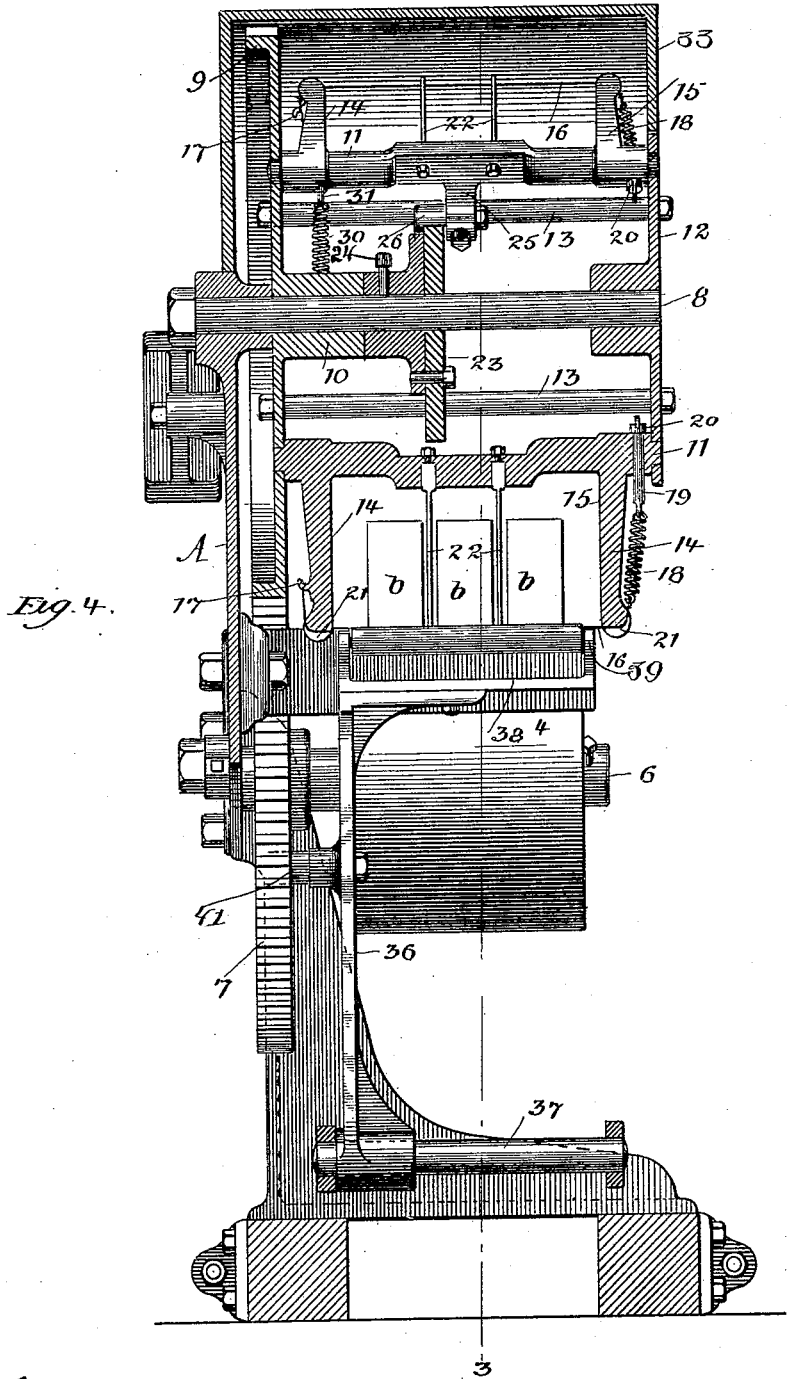
Figure 5:
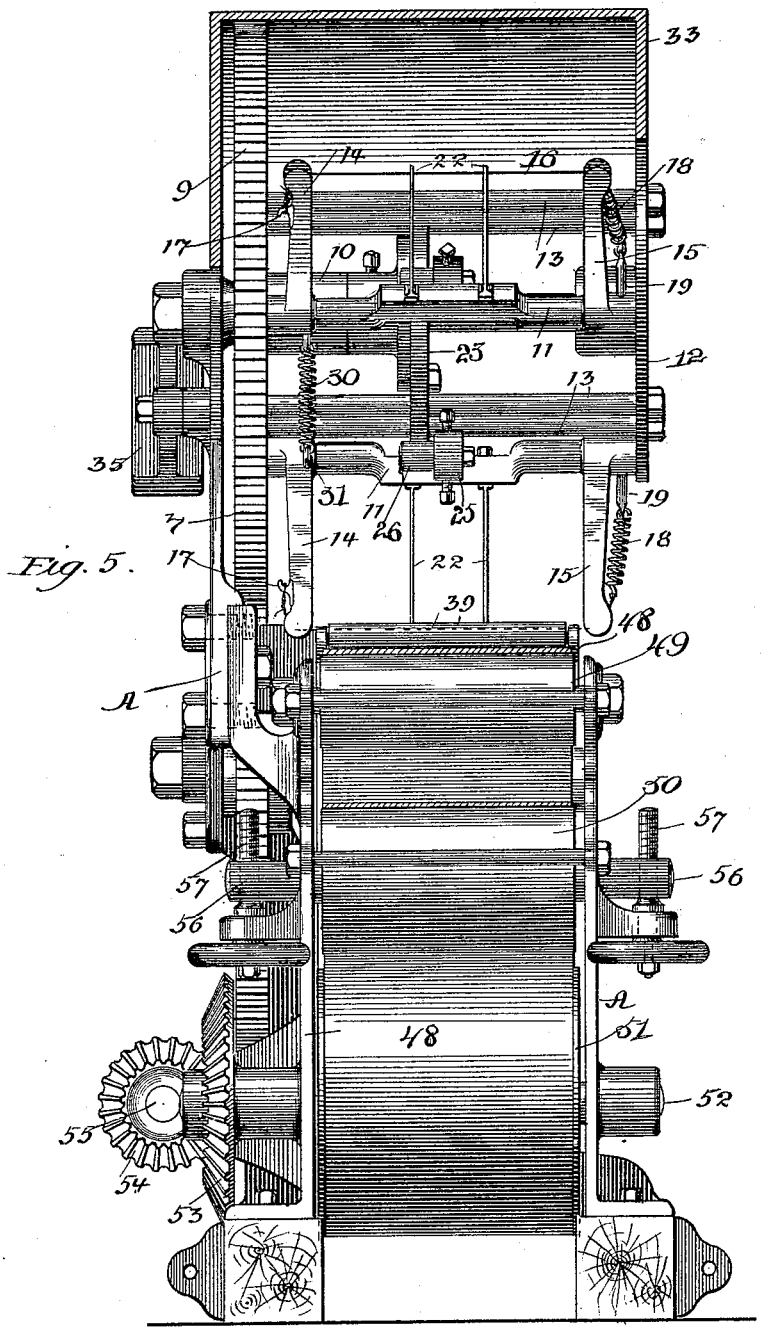

Figure 1 is a side elevation of the cutting-machine and carrying-belts. Fig. 2 is a side elevation of the cutting-machine on the opposite side from Fig. 1. Fig. 3 is a longitudinal section on line 3 3 of Fig. 4. Fig. 4 is a cross-vertical section on line 4 4 of Fig. 3. Fig. 5 is an end elevation, some parts being in section. Fig. 6 is a horizontal section on line 6 6 of Fig. 1. Fig. 7 is a detail, being a vertical section through the parts shown. Fig. 8 is an enlarged detail showing the rotating disk carrying the cutters; and Fig. 9 is a detail similar to Fig. 8, showing the parts in a different position.

My invention relates to that class of brick-machines which automatically cut brick or other clay products from a bar or stream of clay which issues from the die or dies of a clay-working machine.

The leading objects of my invention are to provide automatic devices which shall be driven by the stream of clay and shall operate uniformly upon the moving stream of clay, and to provide improved devices for cutting the bar or stream of clay while moving.

A further object of my invention is to provide an improved tilting table which shall deliver the cut product to the delivery-belt and to provide an oil-trough and rollers.

Further objects of my invention are to provide various adjustments, hereinafter set forth, and various other improvements, specifically pointed out. I accomplish these several objects as illustrated in the drawings and as hereinafter described.

That which I claim as new will be pointed out in the claims.

In the drawings, A represents a suitable frame for supporting the operating parts of the cutting apparatus hereinafter described.

B represents a frame for supporting the carrying-belt which delivers the bar or stream of clay *b* which issues from the die or dies of a clay-working machine.

C represents the frame for supporting the belt which delivers the brick or other clay products from the cutting-machine.

2 represents a carrying-belt, which is supported upon the frame B by means of rollers or otherwise and is driven by the contact of the bar or stream of clay therewith. This belt 2 passes over a loose pulley 3 at the forward end of the frame B and over a band-wheel 4, which is firmly secured upon a tubular shaft or sleeve 5, which is free to rotate upon a stationary shaft 6, secured in the frame A.

Upon the sleeve 5 is secured a spur-wheel 7, Fig. 7.

8 represents a stationary shaft, which is secured in suitable bearings in the upper portion of the frame A. Upon this shaft 8 is loosely mounted a spur-wheel 9, which meshes with the spur-wheel 7, as best shown in Figs. 3 and 4. This wheel 9 is provided with an elongated hub 10 to give it a good support. The stream of clay *b* drives the belt 2, which drives the pulley 4, tubular shaft 5, and spur-wheel 7, and the spur-wheel 7 drives the spur-wheel 9, so that the wheel 9 rotates at a uniform speed in relation to the stream or bar of clay *b*.

11 represents a number of rock-shafts mounted at one end in the wheel 9, and at their other ends in a disk 12, which is loosely mounted upon the outer end of the shaft 8. The disk 12 is further connected with the wheel 9 by means of a number of tie-rods 13. Each rock-shaft 11 is provided with an arm 14 at one end, and an arm 15 at the opposite end, as best shown in Fig. 4.

16 represents a wire which at one end is secured to a projection 17 on the arm 14, and at its other end is connected with a spring 18, which spring at its opposite end is connected with a bolt 19, secured to the rock-shaft 11 and provided with a set-nut 20. The wire 16 passes through slots 21 in the end of the arms 14 and 15, which slots firmly hold the wire in proper position. The spring 18 holds the wire taut, and the tension of the spring 18 may be adjusted by means of the set-nut 20. When it is desired to cut more than one stream or bar of clay, additional arms 22, similar in form to the arms 14 and 15, but somewhat lighter than such arms, may be secured to each rock-shaft 11 between the arms 14 and 15, as best shown in Figs. 4 and 5.

23 represents a cam which is adjustably secured upon the stationary shaft 8 by means of a set-screw 24. This cam is preferably made in the form shown in Figs. 8 and 9.

Each rock-shaft 11 is provided with an arm 25, which is provided with a roller 26, adapted to engage with the cam 23. Each roller 26 is mounted upon a pin 27, which passes through a slot 28 (see Fig. 3) in the arm 25, and it may be adjusted in said slot by means of set-screws 29.

30 represents springs, each of which is attached at one end to an arm 31 on a shaft 11 and at its other end to an arm 32, connected with the hub 10.

The wheel 9 carries around with it the shafts 11. These shafts are rocked by the engagement of the rollers 26 with the cam 23. The form of the cam 23 is such that as the wheel 9 and the shafts 11 thereon revolve the shafts 11 will be rocked by the engagements of the rollers 26 with the cam 23, causing the arms 14 and 15 to assume the various positions shown in Figs. 8 and 9. When the roller passes the point $d$ of the cam 23, the arms 14 and 15 will swing backwardly as the cam increases the distance from the center. At the point $e$ the arms 14 and 15 have been moved backwardly to the limit of their backward motion. From the point $d$ to the point $e$ the wire 16 cuts the bar of clay. The shape of the cam 23 from the point $d$ to the point $e$ is such that the bar $b$ will be cut at right angles while it is moving and the rock-shaft 11 is revolving.

The cam 23 is provided with a sharp incline $f$, as best shown in Fig. 9, down which the roller 26 quickly passes just after the bar or stream of clay has been severed. From the incline $f$ to the point $d$ the cam 23 is formed so that the springs 30 of the rock-shafts 11, which are passing that portion of the cam, will counteract the strain of the spring 30 of the rock-shafts 11, passing from the point $d$ to the point $e$.

As shown and in the machine which I have constructed, four rock-shafts 11 and operating parts connected therewith are provided, and the cam 23 is shaped as shown in Figs. 8 and 9, so that the springs 30 of the inactive rock-shafts counteract the influence of the springs 30 of the acting rock-shafts.

I do not limit my invention to the use of four rock-shafts and connected parts, as any other number may be used. Four rock-shafts and connected parts, however, are preferred, as alternate rock-shafts and connected parts may be thrown out of operation, thereby severing the brick or other clay products of twice the length, which is desirable in some cases; nor do I limit my invention to the peculiar form of cam shown in Fig. 23, as this form can be varied according to the number of rock-shafts and engaging rollers 26 employed. It is essential, however, that from the point $d$ to the point $e$ the form of the cam should be such as to sever the stream or bar $b$ of clay at right angles. By means of the set-screw 24 the cam 23 may be adjusted upon the stationary shaft 8, causing the wire carried by the arms 14 and 15 to act sooner or later, as may be desired. By means of the set-screws 29 the rollers 26 may be adjusted so as to cause the arms 14 and 15 to operate at the proper time.

The springs 18 keep the wires 16 taut, so that they will properly cut the stream or bar of clay. When a wire 16 engages with a stone or other hard substance in the bar or stream of clay, the spring 18 attached thereto will yield sufficiently to allow the wire to pass around such stone or hard substance, thereby preventing breakage of the wire. By means of the set-nuts 20 the tension of the springs 18 may be adjusted as may be necessary.

As shown, I have provided two arms 22 between the arms 14 and 15, which pass between the bars or streams of clay when more than one bar or stream of clay is severed at a time. These arms 22 firmly support the wire 16 without interfering with the bars or streams of clay.

33 represents a cover, which is of such form as to protect the cutting apparatus above described. This cover is hinged upon a rod 34, as best shown in Fig. 3, and a counter-balance 35 is connected therewith, so that it can be readily raised or lowered, as may be desired. I prefer to make this cover of sheet metal.

36 represents an oscillating or rocking standard, which is pivoted at its lower end on a horizontal pivot 37 and at its upper end is provided with a table 38, which oscillates or rocks with the standard. This table 38, when in its normal position, as shown in Fig. 2, is in the same horizontal plane as the belt 2. This table 38 is provided with rollers 39, over which the brick or other clay products can easily slide. The standard 36 is provided with an arm 40, which arm is provided with a pin 41. The pin 41 passes through a slot 42 in the arm 40, so that it can be adjusted on such arm. One face of the wheel 7 has a flange 43, which is adapted to be engaged by the pin 41 or an anti-friction roller on said pin 41. This flange 43 is annular and is provided with a number of cam-recesses 44, as best shown in Figs. 2 and 3. The stream or bar of clay $b$ is severed by the wires 16, operated as before described, forming bricks or other clay products of uniform length. Each wire completes its cut through the bar or stream of clay $b$ at the edge of the table 38 when said table is in its normal position, as shown in Fig. 2. At the instant when the bar $b$ is completely severed one of the cam-recesses 44 arrives at the pin 41, as shown in Fig. 2, which permits the table 38, with its standard, to swing and carry with it the brick or other clay product to the position shown in Fig. 3. At this instant, also, the roller 26 passes down the incline at *f* of the cam 23, so that the wire 16, which has severed the brick or other clay product, will not interfere with such brick or other product. After the delivery of the brick, as hereinafter described, the table 38 will be returned by the cam-recess 44 to the normal position and will be held in such position by the engagement of the pin 41 with the circular or annular portion of the flange 43. The amount of movement and the normal position of the table 38 can be adjusted by adjusting the pin 41 in the slot 42.

45 represents an oil-receptacle, which is located in the same horizontal plane as the upper portion of the belt 2. This receptacle is provided with a projecting portion 46, which projects over the pulley 4 and belt 2, as best shown in Figs. 2 and 3. In this oil-receptacle 45 is located a roller 47, which is arranged to engage with the under surface of the bar or stream of clay for the purpose of supporting such bar and spreading oil on such under surface, so that the brick or other clay product will slide readily.

48 represents a conveyer-belt, which receives the severed brick or other clay product from the tilting table 38. This belt runs over rollers 49 in the frame C, passes around a suitable pulley (see Fig. 1) at the outer end of said frame, over a tightening-pulley 50 at the inner end of said frame C, then around the driving-pulley 51, and thence upward and over one of the pulleys 49 in position to receive a brick from the tilting table 38. The driving-pulley 51 is secured upon a shaft 52, which is mounted in suitable bearings in the frame A and is provided at its outer end with a bevel-pinion 53, which bevel-pinion is driven by a bevel-pinion 54 upon a shaft 55, which is driven by suitable gearing from the driving mechanism in the clay-working machine. The tightening-pulley 50 is mounted upon a stationary shaft 56, which is mounted upon adjusting-screws 57, as best shown in Fig. 5, by which adjusting-screws the pulley 50 may be adjusted to give the proper tension to the belt 48. The driving-pulley 51 rotates in the direction indicated by the arrow in Fig. 3, so that the belt 48 draws from the outer end of the frame C, and thereby allows whatever slack there may be in such belt 48 to be in the portion between the outer end of the frame C and the table 38 above the rollers 49, on which portion the bricks or other clay products are carried.

In order to sever the bricks at different lengths, larger or smaller pulleys or wheels 4 may be placed upon the sleeve 5, thereby driving the wheel 7 faster or slower, as desired.

In order to employ pulleys of different sizes, the shaft 6 must be adjusted vertically to bring the upper face of the pulley in the same horizontal plane as the oil-receptacle 45 and the frame B. I prefer to adjust this shaft 6 vertically by attaching it to an eccentric-block 58, which is secured to the frame A by a bolt 59, as best shown in Fig. 7. By partially rotating the block 58 the position of the shaft 6 may be adjusted as necessary.

In order to cause the spur-wheel 7 to properly mesh with the spur-wheel 9 after the shaft 6 has been adjusted vertically, the frame A is provided with a slot 60, through which the bolt 59 passes, and in which the bolt may be adjusted by means of the set-screws 61, as shown in Fig. 1.

By the cutting apparatus above described the bricks or other clay products are severed in uniform lengths as the cutting mechanism is driven by the belt which carries the stream or bar of clay, and which is driven by the moving stream or bar of clay. Other mechanism—such as that shown in my former patent, No. 411,546, dated September 24, 1889—have been employed for severing the bricks at uniform lengths, which mechanisms have been operated automatically by the devices controlled by the movement of the bar or stream of clay; but such devices are not driven directly by the bar of clay, which is the chief feature of my present invention.

By my invention the revolution of the clay-cutter is timed by the movement of the clay-driven belt, and consequently the articles are severed in uniform lengths, and the speed of the revolving cutter is varied by changing the speed of the clay. Further, if the traveling movement of the clay ceases the revolution of the cutter also ceases, and these features are important in this class of machines.

I have shown the stationary cam 23 as located between the wheel 9 and disk 12; but it is evident that the position of the stationary cam may be varied, and the position of the arms 25 of the rock-shafts 11 must be varied accordingly, and in some cases it may be found preferable to place the stationary cam 23 on the shaft 8 outside of the disk 12. The essential feature, however, is that the cam 23 be stationary and of such form that it will cause the wires 16 on the arms 14 and 15 to sever the moving bar of clay at right angles.

What I claim as new, and desire to secure by Letters Patent, is—

1. In a machine for cutting brick or other clay products, the combination, with a clay-belt driven by a bar or stream of clay, of a revolving cutter, a pivoted table oscillating in the arc of a circle beneath the clay, and gearing actuated by the driven clay-belt for revolving the cutter and oscillating the table, substantially as described.

2. In a machine for cutting brick or other clay products, the combination of a revolving support, a rock-shaft carried by the support and provided with arms, a cutting-wire connected with the arms, a stationary cam, an arm on the rock-shaft engaging the cam, and mechanism for revolving the support, substantially as described.

3. In a machine for cutting brick or other clay products, the combination, with a stationary cam 23, of a wheel 9, rock-shafts 11, having arms 14 and 15, arms 25, rollers 26, springs 30, and cutting-wires 16, substantially as and for the purpose specified.

4. In a machine for cutting brick or other clay products, the combination, with an endless clay-belt driven by a bar or stream of clay, and a shaft having a pulley supporting and rotated by the driven clay-belt, of a revolving support having a series of rock-shafts, provided with attached arms carrying cutting-wires, gearing actuated by the driven clay-belt for continuously and positively revolving the support, and cam mechanism for rocking the rock-shafts on the support as the latter is revolved by the driven clay-belt, substantially as described.

5. In a machine for cutting brick or other clay products, the combination, with a cutting-wire, of arms 14 and 15, having slots 21, adapted to receive said wire, and intermediate arms 22, substantially as specified.

6. In a machine for cutting brick or other clay products, the combination, with a clay-belt, of a vertically-adjustable shaft 6, a tubular shaft or sleeve 5, loose thereupon and provided with a removable pulley 4, supporting and rotated by the clay-belt, means for raising and lowering the adjustable shaft, and a revolving cutter geared to and revolved by the tubular shaft or sleeve, substantially as described.

7. In a machine for cutting brick or other clay products, the combination, with a wheel 9, rock-shafts 11, carried thereby, and cutting-wires carried by arms on said rock-shafts, of a wheel 7, pulley 4, and a belt 2, driven by a bar or stream of clay, substantially as and for the purpose specified.

8. In a machine for cutting brick or other clay products, the combination, with a cutting mechanism, of a pivoted table oscillating in a vertical plane in the arc of a circle at a point directly under the cutting mechanism and supporting and swinging with the severed brick or other product, substantially as described.

9. In a machine for cutting brick or other clay products, the combination, with a cutting mechanism, and a clay-belt driven by a bar or stream of clay, of a pivoted table oscillating in a vertical plane in the arc of a circle and supporting and swinging with the severed brick or other product, and mechanism actuated by the driven clay-belt for oscillating the table, substantially as described.

10. In a machine for cutting brick or other clay products, the combination, with a table 38, of a tilting standard 36, arm 40, wheel 7, provided with cams 44, and a pulley 4, substantially as and for the purpose specified.

11. In a machine for cutting brick or other clay products, a cutting-wire, supporting-arms for said wire, rock-shafts 11, cam 23, and driving mechanism directly driven by the movement of a bar or stream of clay, in combination with a tilting table, and mechanism for tilting said table operated by the movement of the bar of clay, substantially as specified.

12. In a machine for cutting brick or other clay products, the combination, with a cutting mechanism, an endless clay-belt, and an endless receiving-belt running in an inclined plane, of a pivoted table oscillating in a vertical plane in the arc of a circle under the cutting mechanism at a point between the two belts and supporting and swinging with the severed product through the space between the belts, substantially as described.

WILLIAM R. CUNNINGHAM.

Witnesses:
JOHN F. KRAMER,
JAS. McCLAMROCH.